May 6, 1930.  A. J. KERCHER ET AL  1,757,315
HOT PLATE
Filed Nov. 9, 1926
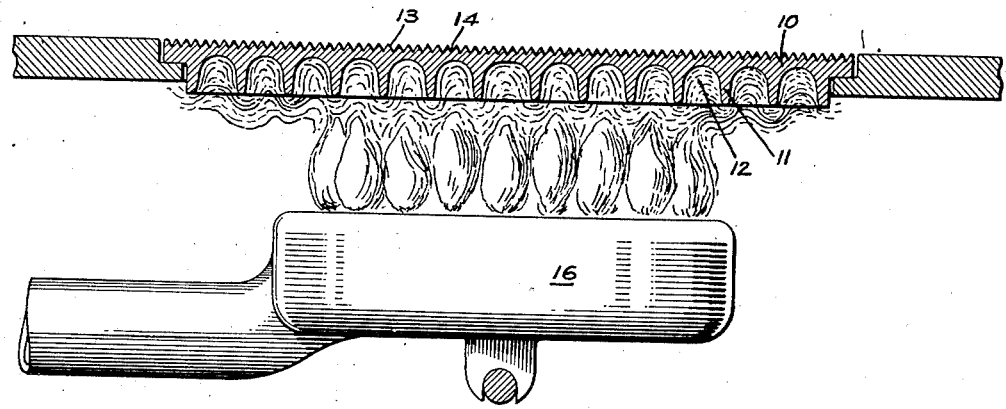
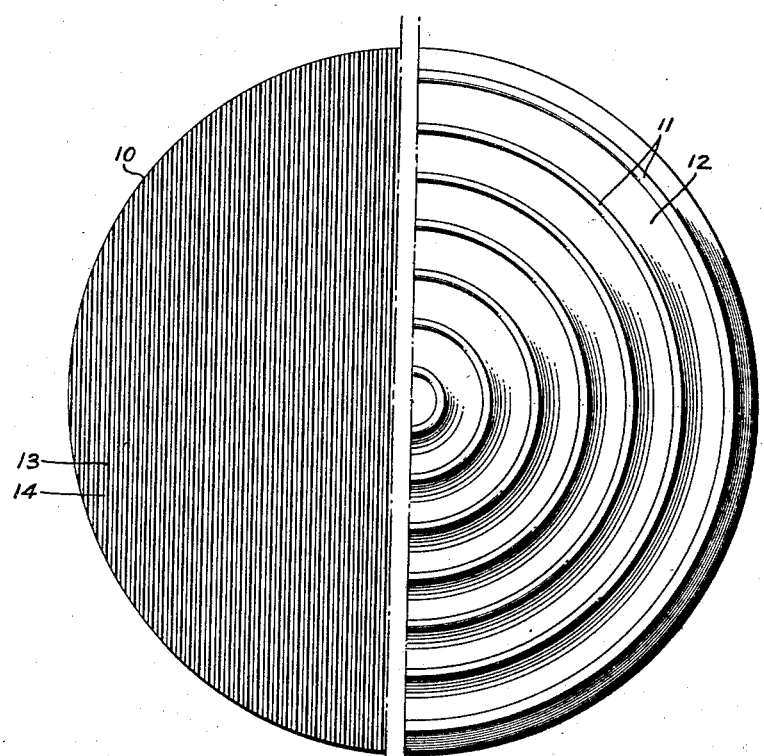
INVENTORS
Arthur J. Kercher
BY William Wesley Hicks
White & Prost
their ATTORNEYS Patented May 6, 1930

1,757,315

UNITED STATES PATENT OFFICE

ARTHUR J. KERCHER, OF BERKELEY, AND WILLIAM WESLEY HICKS, OF SAN FRANCISCO, CALIFORNIA, ASSIGNORS TO WESIX NATIONAL COMPANY, OF SAN FRANCISCO, CALIFORNIA, A CORPORATION OF DELAWARE

HOT PLATE

Application filed November 9, 1926. Serial No. 147,228.

This invention relates generally to devices employed to transmit heat for cooking purposes and which are commonly known as hot plates.

In cooking stoves or ranges it has been common practice to employ one or more plane surfaced metal plates supported so as to form a part of the upper surface of the stove. The lower faces of these plates absorb heat from a fuel flame, or from an electrical heating element, and the upper surfaces transmit this heat to the bottom of a cooking utensil. Due to the smooth or plane surfaces employed these plates are thermally inefficient since they absorb only a small percentage of the heat developed at the source and as they do not readily transmit the absorbed heat to a cooking utensil. They are also subject to buckling and cracking, especially when heated to high temperatures or when suddenly chilled by spilled liquids. Furthermore, because of the large mass of metal employed such plates have a relatively large heat lag; that is, a considerable time is required to bring them to an operating temperature.

It is an object of this invention to devise a metal hot plate which will act as an efficient transmitter of heat to a cooking utensil.

It is a further object of this invention to devise a hot plate which will not buckle or crank and which will have a small heat bag.

Further objects of this invention will appear from the following description in which we have set forth the preferred embodiment of our invention. It is to be understood that the invention is to be accorded a range of equivalents consistent with the state of the prior art.

Referring to the drawings:

Figure 1 is a cross sectional view of a hot plate incorporating the principles of this invention.

Fig. 2 is a top plan view of a portion of the hot plate of Fig. 1,

Fig. 3 is a bottom plan view of a portion of the hot plate shown in Fig. 1.

The invention comprises generally a metal plate having its lower face formed to provide an augmented heat absorbing area and its upper face formed to provide an augmented heat transmitting area. These areas are preferably formed by providing ribs upon both faces of the plate, these ribs preferably running at angles to each other in order to reinforce the plate against buckling. When the device is employed to absorb heat from a fuel flame, the ribs upon the lower surface are formed to extend at an angle to the radii of the plate in order to act as baffle walls with respect to the flame and products of combustion.

Referring to the specific embodiment of the invention which we have illustrated in the drawings, there is shown a metal plate 10 constructed of metal having good heat conducting properties, such as cast iron. The lower face of this plate which is intended to act as an absorber of heat, is provided with a plurality of integral ribs 11 which in this instance are made concentric so as to provide a plurality of concentric grooves 12. The upper face of the plate is provided with a plurality of integral ribs 13 which thereby form spaced grooves 14. These grooves 14 are shown as extending in spaced parallel relationship across the upper face of the plate and since they extend at angles to the greater portions of the lower ribs 11, the plate is adequately reinforced against buckling in any direction. The effect of providing the ribs 11 and 13 upon the surface of the plate is to greatly augment the effective heat absorption and transmitting areas of the plate. Preferably the ribs are proportioned so that the heat transmitting area is at least as great as the heat absorbing area in order to provide for the adequate transmission of the absorbed heat from the plate. When a cooking utensil is placed over the upper face heat is not only imparted to the utensil by direct conduction, but also by direct radiation from the surfaces of the plate exposed by the grooves 14.

Because of the nature of the lower ribs 11 the plate described above is especially adapted to be used to absorb heat from a fuel flame. For example, in the drawings the plate has been shown as disposed over a gas burner 16 so that the flame of the burner will play upon the lower ribbed face of the plate. The flame and the products of combustion as they strike the plate tend to flow outwardly along directions radial with respect to the plate. Since the lower ribs and grooves extend at angles to the radii of the plate they tend to intercept the general movement of the flame, thus insuring maximum absorption of heat by the plate. Furthermore, these grooves act as pockets to retain unburned gases so as to insure complete combustion.

In addition to being an efficient absorber and transmitter of heat, the device of this invention has many other inherent qualities which make it especially adaptable for use with stoves or ranges. Because of the reinforcing action of the ribs the plate will not warp or buckle even when heated to high temperatures. Because of the large upper radiating area the heat is always adequately dissipated from the plate, even though it is not in contact with the bottom of a cooking utensil. Compared to a hot plate having a smooth upper surface, this plate will transmit more heat to a cooking utensil than a plane face operating at higher temperatures, because the ribs provide many points of contact and heat is directly radiated and absorbed by the bottom of the utensil. As the ribs are evenly distributed over the surfaces, the heat is uniformly distributed over the plate and therefore localized hot spots are eliminated. If the plate is suddenly chilled from a high temperature as by pouring water upon its upper face, the water forms steam pockets within the grooves 14 which prevent a too sudden lowering in temperature of the body of the plate, with result that the plate is not stressed to the point of cracking. The reinforcement provided by the ribs also makes it possible to manufacture such a plate with a relatively small mass of metal, so that the heat lag is reduced to a minimum.

We claim:

1. A device for fuel cooking stoves adapted to transmit heat to the bottom of a cooking utensil comprising a relatively flat metal plate having a plurality of spaced parallel ribs substantially covering its upper surface to provide an augmented heat transmitting area, and a plurality of integral ribs substantially covering the lower surface of the same to provide an augmented heat absorbing area, the ribs upon the lower surface being arranged at an angle to the ribs on the upper surface whereby buckling and cracking of the plate is prevented, substantially all of said lower ribs extending in nonradial directions with respect to the center of the plate whereby said ribs serve to baffle flame directed upon said lower surface.

2. A device for fuel cooking stoves adapted to transmit heat to the bottom of a cooking utensil comprising a relatively flat metal plate having a plurality of spaced parallel ribs substantially covering its upper surface to provide an augmented heat transmitting area, and a plurality of integral ribs substantially covering its lower face and extending at an angle to the upper ribs, said last named ribs forming concentric annular grooves, whereby buckling and cracking of the plate is prevented and whereby flame directed upon said lower surface is baffled by said lower ribs.

3. A device for use on a cooking range adapted to extend over a source of heat for transmitting heat to the bottom of a cooking utensil, comprising a plate having a plurality of parallel integral ribs extending over substantially all of its upper surface to provide an augmented heat radiating area, and a plurality of integral ribs extending over substantially all of its lower surface to provide an augmented heat absorbing area, the ribs on the lower surface being disposed in angular relationship to the ribs on the upper surface.

In testimony whereof, we have hereunto set our hands.

ARTHUR J. KERCHER.
WILLIAM WESLEY HICKS.